United States Patent
Ikeda et al.

(10) Patent No.: US 6,628,575 B1
(45) Date of Patent: Sep. 30, 2003

(54) TRACK JUMP METHOD FOR ZCAV SYSTEM AND STORAGE APPARATUS EMPLOYING ZCAV SYSTEM

(75) Inventors: Toru Ikeda, Kawasaki (JP); Hiroshi Tani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 09/798,717

(22) Filed: Mar. 2, 2001

(30) Foreign Application Priority Data

Sep. 29, 2000 (JP) ........................................ 2000-301463

(51) Int. Cl.$^7$ .............................................. G11B 21/08
(52) U.S. Cl. .................................. 369/30.12; 369/44.28
(58) Field of Search ........................... 369/30.12, 30.13, 369/30.1, 30.14, 44.28, 44.27, 44.29, 30.11

(56) References Cited

U.S. PATENT DOCUMENTS

| | | | |
|---|---|---|---|
| 5,136,560 A | | 8/1992 | Hangai et al. |
| 5,703,842 A | * | 12/1997 | Tonegawa ..................... 369/32 |
| 5,717,669 A | * | 2/1998 | Kimura et al. ................. 369/48 |
| 5,768,229 A | * | 6/1998 | Ikeda ....................... 369/44.28 |
| 5,808,975 A | * | 9/1998 | Tani ............................ 369/32 |
| 5,870,356 A | * | 2/1999 | Ikeda ........................... 369/32 |
| 6,014,349 A | * | 1/2000 | Iwasaki et al. ................ 369/32 |
| 6,067,284 A | * | 5/2000 | Ikeda et al. .................. 369/116 |
| 6,385,144 B1 | * | 5/2002 | Kuriuzawa et al. ...... 369/30.12 |

FOREIGN PATENT DOCUMENTS

| | | |
|---|---|---|
| JP | 2-220287 | 9/1990 |
| JP | 6-267209 | 9/1994 |
| JP | 9-027131 | 1/1997 |
| JP | 9055014 | 2/1997 |
| JP | 10-334625 | 12/1998 |
| JP | 11073669 | 3/1999 |
| JP | 20000187855 | 7/2000 |
| JP | 2000-339729 | 12/2000 |

* cited by examiner

*Primary Examiner*—Tan Dinh
(74) *Attorney, Agent, or Firm*—Greer, Burns & Crain, Ltd.

(57) ABSTRACT

A storage apparatus has a function of jumping to an arbitrary track on a recording medium in response to a track jump request when making access to the recording medium, where the recording medium is divided into a plurality of zones in a radial direction thereof and employing a ZCAV system. The storage apparatus includes a zone recognizing part recognizing a zone to which a present position on the recording medium belongs, and a jumping part jumping to a first zone to which the arbitrary track belongs or to a second zone which is adjacent to the first zone, based on the zone recognized by the zone recognizing part.

14 Claims, 14 Drawing Sheets

FIG.3

| ZONE | ZCAV | 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG. 7

|    | 3637rpm | 4138rpm | 5001rpm |
|----|---------|---------|---------|
| 0  | 80.34   | -       | -       |
| 1  | 78.38   | -       | -       |
| 2  | 76.42   | -       | -       |
| 3  | 74.46   | -       | -       |
| 4  | 72.5    | -       | -       |
| 5  | 70.55   | 80.28   | -       |
| 6  | 68.59   | 78.05   | -       |
| 7  | 66.63   | 75.82   | -       |
| 8  | 64.67   | 73.59   | -       |
| 9  | 62.71   | 71.36   | -       |
| 10 | 60.75   | 69.13   | -       |
| 11 | 58.79   | 66.9    | 80.83   |
| 12 | 56.83   | 64.67   | 78.11   |
| 13 | 54.87   | 62.44   | 75.44   |
| 14 | 52.91   | 60.21   | 72.75   |
| 15 | 50.95   | 57.98   | 70.06   |
| 16 | 48.99   | 55.75   | 67.36   |
| 17 | 47.03   | 53.52   | 64.67   |

FIG.11

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG.13

| ZONE | PHYSICAL TRACKS | SECTOR/ PHYSICAL TRACKS |
|---|---|---|
| LEAD-IN | 323 | 41 |
| 0 | 1071 | 41 |
| 1 | 1071 | 40 |
| 2 | 1071 | 39 |
| 3 | 1071 | 38 |
| 4 | 1071 | 37 |
| 5 | 1071 | 36 |
| 6 | 1071 | 35 |
| 7 | 1071 | 34 |
| 8 | 1071 | 33 |
| 9 | 1071 | 32 |
| 10 | 1071 | 31 |
| 11 | 1071 | 30 |
| 12 | 1071 | 29 |
| 13 | 1071 | 28 |
| 14 | 1071 | 27 |
| 15 | 1071 | 26 |
| 16 | 1071 | 25 |
| 17 | 1071 | 24 |
| CONTROL | 102 | 12 |
| LEAD-OUT | 1071 | 23 |

TRACK JUMP METHOD FOR ZCAV SYSTEM AND STORAGE APPARATUS EMPLOYING ZCAV SYSTEM

BACKGROUND OF THE INVENTION

This application claims the benefit of a Japanese Patent Application No. 2000-301463 filed Sep. 29, 2000, in the Japanese Patent Office, the disclosure of which is hereby incorporated by reference.

1. Field of the Invention

The present invention generally relates to track jump methods and storage apparatuses, and more particularly to a track jump method for jumping to an arbitrary track on a recording medium such as an optical disk when recording signals on the recording medium and reproducing signals from the recording medium, and to a storage apparatus which employs such a track jump method.

Recording media such as optical disks employ a zone constant angular velocity (ZCAV) system or a zone constant linear velocity (ZCLV) system. When the ZCAV system is employed, it is possible to obtain a high random access performance with respect to the recording medium, but a recording and/or reproducing clock frequency becomes low. For example, a data transfer rate at an inner periphery of the optical disk becomes slow. On the other hand, when the ZCLV system is employed, it is possible to obtain a high data transfer rate, but the random access performance with respect to the recording medium becomes poor because the rotational speed of the recording medium such as the optical disk changes upon access thereto.

2. Description of the Related Art

Recently, due to the popular use of the Internet, there are increased opportunities for users to download data, such as music and video data, via a communication line or the like, and to record the downloaded data in recording media. In such cases, magnetic disks of a hard disk drive (HDD), and removable optical disks such as a digital versatile disk random access memory (DVD-RAM) are used as the recording media.

In the case of the video data, the size of one file is relatively large. In addition, the video data is a continuous data, and it is necessary to continuously and stably maintain the data transfer rate over a predetermined value during recording to or reproduction from the optical disk, in order not to generate an image distortion such as frame dropout.

On the other hand, in personal computers or the like, a disk management area is usually provided in a portion of the optical disk for the purposes of managing programs and files. Accordingly, it becomes necessary to access the disk management area every time an access is made to the program or file. For this reason, in a case where the size of each file is relatively small, the access to the file and the access to the disk management area are repeated, to thereby generate a random access to the optical disk.

Therefore, the required data transfer rate and the required random access performance differ depending on the state of use of the recording medium, such as the kind of data processed, the file size and the usage of the recording medium.

Conventionally, there was a problem in that the data transfer rate and the random access performance cannot be set appropriately depending on the state of use of the recording medium, such as the kind of data processed, the file size and the usage of the recording medium.

In addition, when the recording medium such as the disk is rotated at a high speed in order to appropriately set the data transfer rate and the random access performance, there is a possibility that an identification (ID) signal which indicates the position on the recording medium will no longer be correctly detectable, and there is a possibility that a track jump to a desired track on the recording medium can no longer be guaranteed under such circumstances.

SUMMARY OF THE INVENTION

Accordingly, it is a general object of the present invention to provide a novel and useful track jump method and storage apparatus, in which the problems described above are eliminated.

Another and more specific object of the present invention is to provide a track jump method and a storage apparatus which can set a data transfer rate and a random access performance to optimum values depending on a state of use of a recording medium, and guarantee a normal track jump to a desired track on the recording medium.

Still another object of the present invention is to provide a track jump method for jumping to an arbitrary track on a recording medium when making access to the recording medium, where the recording medium is divided into a plurality of zones in a radial direction thereof and employing a ZCAV system, and the track jump method comprises the steps of (a) recognizing a zone to which a present position on the recording medium belongs, and (b) jumping to a first zone to which the arbitrary track belongs or to a second zone which is adjacent to the first zone, based on the zone recognized by the step (a). According to the track jump method of the present invention, it is possible to set a data transfer rate and a random access performance to optimum values depending on a state of use of a recording medium, and guarantee a normal track jump to a desired track on the recording medium.

A further object of the present invention is to provide a storage apparatus for jumping to an arbitrary track on a recording medium in response to a track jump request when making access to the recording medium, where the recording medium is divided into a plurality of zones in a radial direction thereof and employing a ZCAV system, and the storage apparatus comprises a zone recognizing part recognizing a zone to which a present position on the recording medium belongs, and a jumping part jumping to a first zone to which the arbitrary track belongs or to a second zone which is adjacent to the first zone, based on the zone recognized by the zone recognizing part. According to the storage apparatus of the present invention, it is possible to set a data transfer rate and a random access performance to optimum values depending on a state of use of a recording medium, and guarantee a normal track jump to a desired track on the recording medium.

Other objects and further features of the present invention will be apparent from the following detailed description when read in conjunction with the accompanying drawings.

BRIEF DESCRIPTION OF THE DRAWINGS

FIG. 3 is a diagram showing the relationships of a zone on an optical disk, a data transfer rate and a rotational speed of the optical disk;

FIG. 7 is a diagram showing the relationships of the zone on the optical disk, a recording or reproducing clock frequency and the rotational speed of the optical disk;

FIG. 11 is a diagram for explaining a buffer region provided on the optical disk;

FIG. 13 is a diagram showing a table which stores an example of a media specification.

DESCRIPTION OF THE PREFERRED EMBODIMENTS

Figure 1:
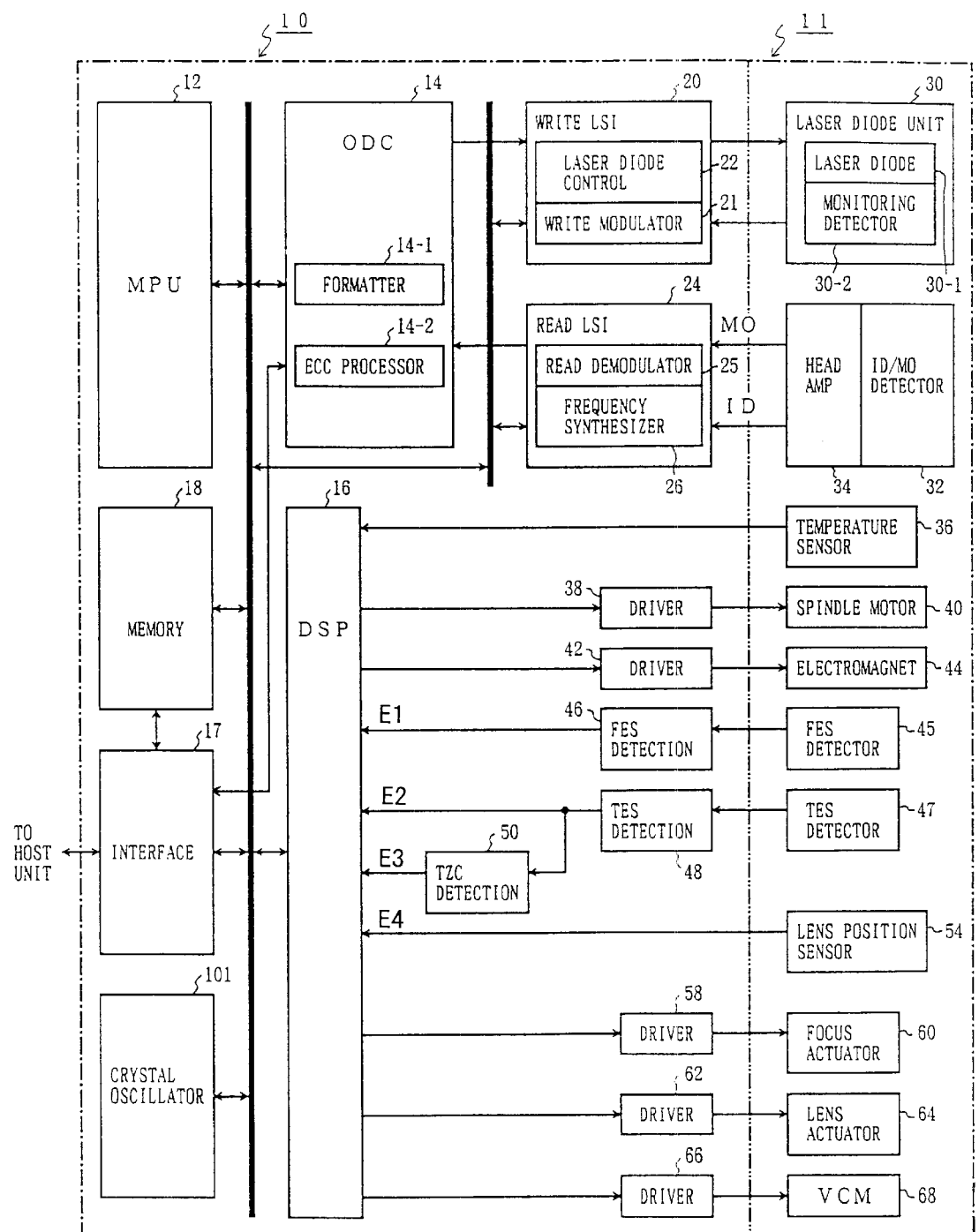
FIG. 1 is a system block diagram showing the construction of a first embodiment of a storage apparatus according to the present invention.

A description will be given of embodiments of a track jump method according to the present invention and a storage apparatus according to the present invention, by referring to the drawings.

First, a description will be given of a first embodiment of the storage apparatus according to the present invention, by referring to FIGS. 1 and 2. FIG. 1 is a system block diagram showing the construction of this first embodiment of the storage apparatus. In this first embodiment of the storage apparatus, the present invention is applied to an optical disk unit. In addition, this first embodiment of the storage apparatus employs a first embodiment of the track jump method according to the present invention.

As shown in FIG. 1, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 14, and for example, includes a dynamic random access memory (DRAM), a nonvolatile memory which stores control programs and flag information, or the like. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1-7 run length limited (RLL) code, for example.

At the time of a read access, a reverse conversion of the 1-7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse-width modulation (PWM) recording (or edge recording).

When recording and reproducing data with respect to the optical disk using the laser diode unit 30, this embodiment uses a writable magneto-optical (MO) cartridge medium employing the PWM recording which records the data in correspondence with the existence of mark edges on the optical disk. In addition, the recording format used by the optical disk is a 1.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 12 based on pit intervals of the ID portion. The MPU 12 notifies the recognition result indicating the type of optical disk to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PWM data back into the original NRZ data. In addition, since the ZCAV system is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reproducing reference clock having a predetermined specific frequency depending on the zone position on the optical disk. In other words, the frequency synthesizer 26 is formed by the PLL circuit having the programmable frequency divider, and in a normal mode, generates the recording and/or reproducing reference clock having a frequency fo based on fo=(m/n)fi according to a frequency dividing ratio m/n which is set by the MPU 12 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 26.

The read data demodulated in the read LSI circuit 24 is supplied to the read system of the ODC 14, and after carrying out the reverse conversion of the 1-7 RLL, the CRC and the ECC processes are carried out by the encoding function of the ECC processor 14-2 so as to restore the original NRZ data. Next, the formatter 14-1 connects and converts the NRZ sector data into the NRZ data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the ZCAV system is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB format employing the MSR, the electromagnet 44 also supplies the external magnetic field on the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES El from a detection signal received from the FES detector 45, and inputs this FES El to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an object lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 2:
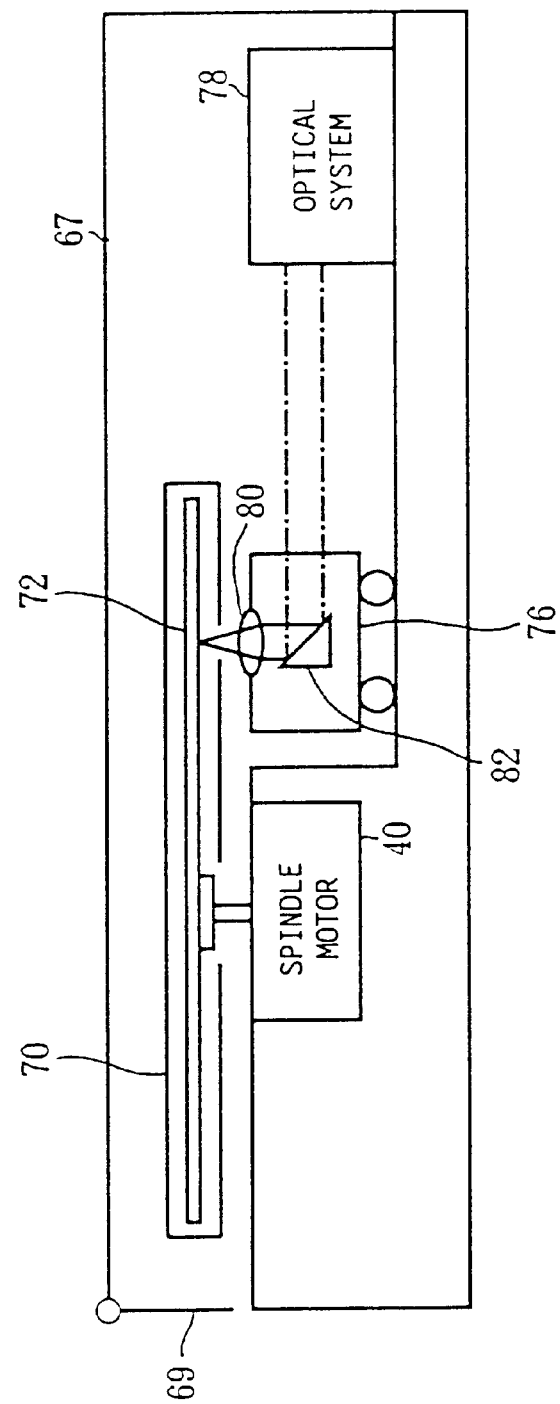
FIG. 2 is a cross sectional view showing the general construction of an enclosure.

FIG. 2 is a cross sectional view showing the general construction of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below the loaded optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure shown in FIG. 1. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Since the ZCAV system is employed, the optical disk 72 is divided into a plurality of zones in the radial direction thereof. In the normal mode, the optical disk 72 is rotated at a constant rotational speed by the spindle motor 40, and the recording and/or reproducing reference clock has the same frequency within each of the zones. In addition, the frequency of the recording and/or reproducing clock is set higher for the outer peripheral side of the optical disk 72 than the inner peripheral side of the optical disk 72. In this embodiment, this optical disk 72 is divided into a number of areas less than or equal to the number of zones, from the outer peripheral side to the inner peripheral side of the optical disk 72. Furthermore, the spindle motor 40 is controlled so that the rotational speed of the optical disk 72 becomes higher towards the inner peripheral side for every area. In other words, in a high-speed mode, the rotational speed of the optical disk 72 is switched in each area by a number of times such that undesirable effects on the random access performance are suppressed, and the recording and/or reproducing clock and the recording and/or reproducing power in the laser diode control circuit 22 are switched accordingly. Hence, in the normal mode, a high random access performance is obtained because the optical disk 72 which employs the ZCAV system is used in conformance with the ZCAV system. On the other hand, in the high-speed mode, a high data transfer rate is obtained during the recording and/or reproduction with respect to the optical disk 72 because the optical disk 72 which employs the ZCAV system is used in conformance with a kind of ZCLV system.

In the normal mode, the rotational speed of the optical disk 72 is controlled to be constant. On the other hand, the rotational speed of the optical disk 72 is switched and controlled in a plurality of stages.

Figure 4:
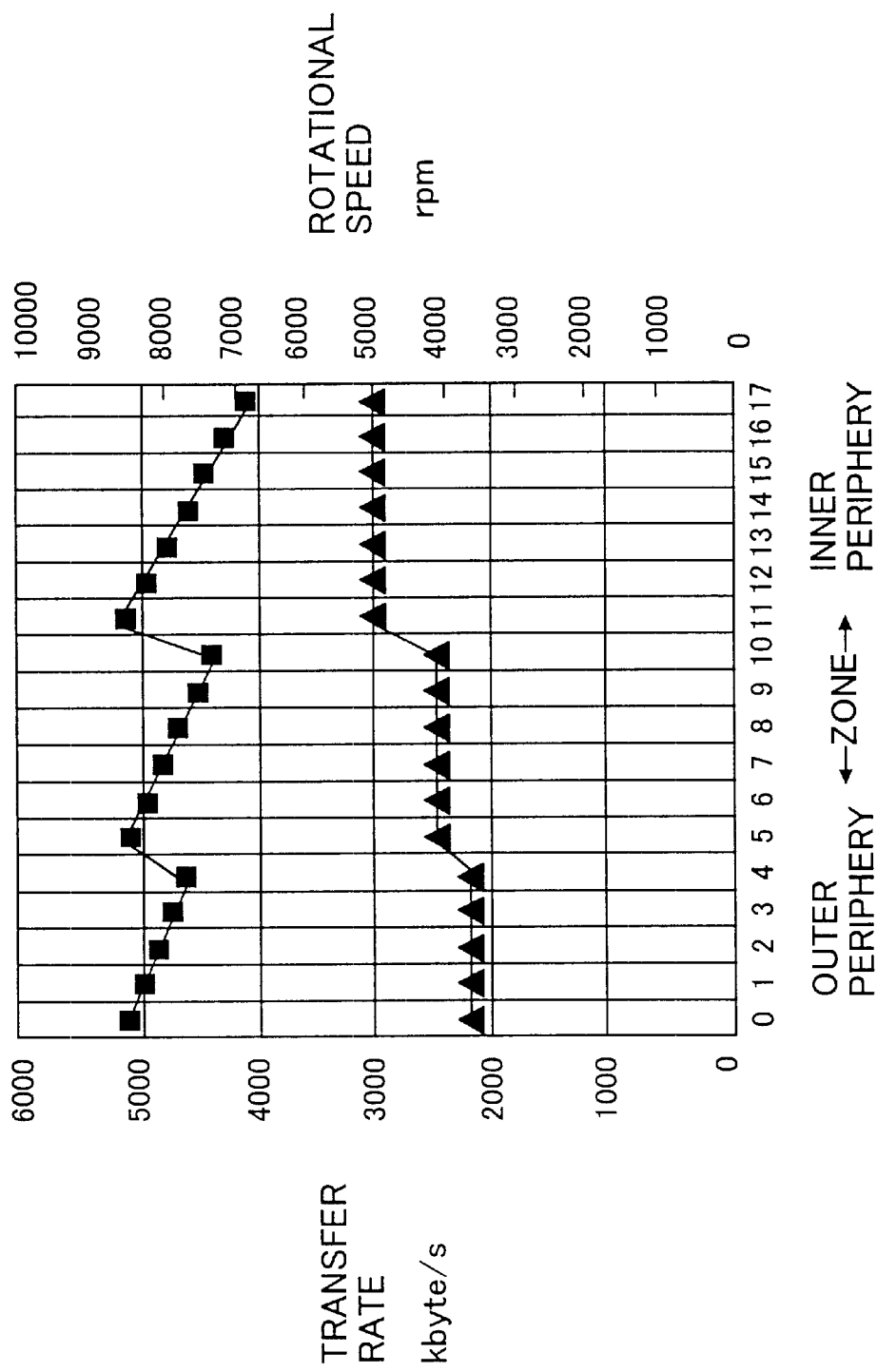
FIG. 4 is a diagram showing the relationships of the data transfer rate and the rotational speed of the optical disk with respect to the zone on the optical disk.

FIG. 3 is a diagram showing the relationships of the zone on the optical disk 72, the data transfer rate and the rotational speed of the optical disk 72. For the sake of convenience, FIG. 3 shows a case where one area is made up of zone units, but as described above, the relationship between the area and the zone is not limited to that shown in FIG. 3. In addition, FIG. 4 is a diagram showing the relationships of the data transfer rate and the rotational speed of the optical disk 72 with respect to the zone on the optical disk 72. In FIG. 4, a rectangular mark indicates the data transfer rate, and a triangular mark indicates the rotational speed of the optical disk 72. FIGS. 3 and 4 show the relationships for a case where the optical disk 72 has a storage capacity of 1.3 GB and the rotational speed of the optical disk 72 can be switched among three rotational speeds in the high-speed mode. Furthermore, it is assumed for the sake of convenience that a zone 0 is located on the outer peripheral side of the optical disk 72 and a zone 17 is located on the inner peripheral side of the optical disk 72.

In the high-speed mode, in the zone 17 located at the innermost peripheral side of the optical disk 72, for example, the rotational speed of the optical disk 72 is switched to 5001 rpm, and the data transfer rate is 4097 Kbyte/s. In the normal mode, the rotational speed is 3637 rpm and the data transfer rate is 2979 Kbyte/s in the zone 17, and it may be seen that the data transfer rate is improved in the high-speed mode. Accordingly, it is possible to obtain a desired data transfer rate on the order of approximately 3700 to 3800 Kbyte/s. In this embodiment, the upper limit of the data transfer rate is restricted to 5121 Kbyte/s or less due to a limit frequency of the circuit, and for this reason, it is not possible to operate at the rotational speed of 5001 rpm in the zones 0 through 10 located on the outer peripheral side of the zone 11. However, the rotational speeds and the data transfer rates which are switched are of course not limited to those shown in FIGS. 3 and 4, and the number of switchable rotational speeds is not limited to three.

In the case of a continuous data such as video and music data amounting to a large amount of data, the video or music stops during the recording and/or reproduction to generate an image distortion, frame dropout and the like, unless the data transfer rate is maintained over a reference value. The data transfer rate during the recording and/or reproduction of a digital video (DV) format is 3700 to 3800 Kbyte/s, and the image and sound becomes discontinuous if the data transfer rate is lower than this data transfer rate range. In the case shown in FIG. 3, the data transfer rate is lower than 3700 Kbyte/s on the inner peripheral side of the zones 12 through 17 when the rotational speed is 3637 rpm, and it may be seen that this data transfer rate is not suited for the recording and/or reproduction of the continuous data such as the video and music data amounting to the large amount of data. Hence, the rotational speed is switched to 5001 rpm, so that the data transfer rate of 3700 to 3800 Kbyte/s is guaranteed from the inner peripheral side to the outer peripheral side of the optical disk 72. Because of the limit frequency of the circuit, it is not possible to set the rotational speed to 5001 rpm or higher at all areas on the optical disk 72, and for this reason, an area where the rotational speed is set to 4138 rpm is also provided on the optical disk 72. In this manner, the rotational speed of the optical disk 72 is changed depending on the area, so that the data transfer rate becomes 3700 to 3800 Kbyte/s or greater at all areas from the inner peripheral side to the outer peripheral side of the optical disk 72.

Figure 5:
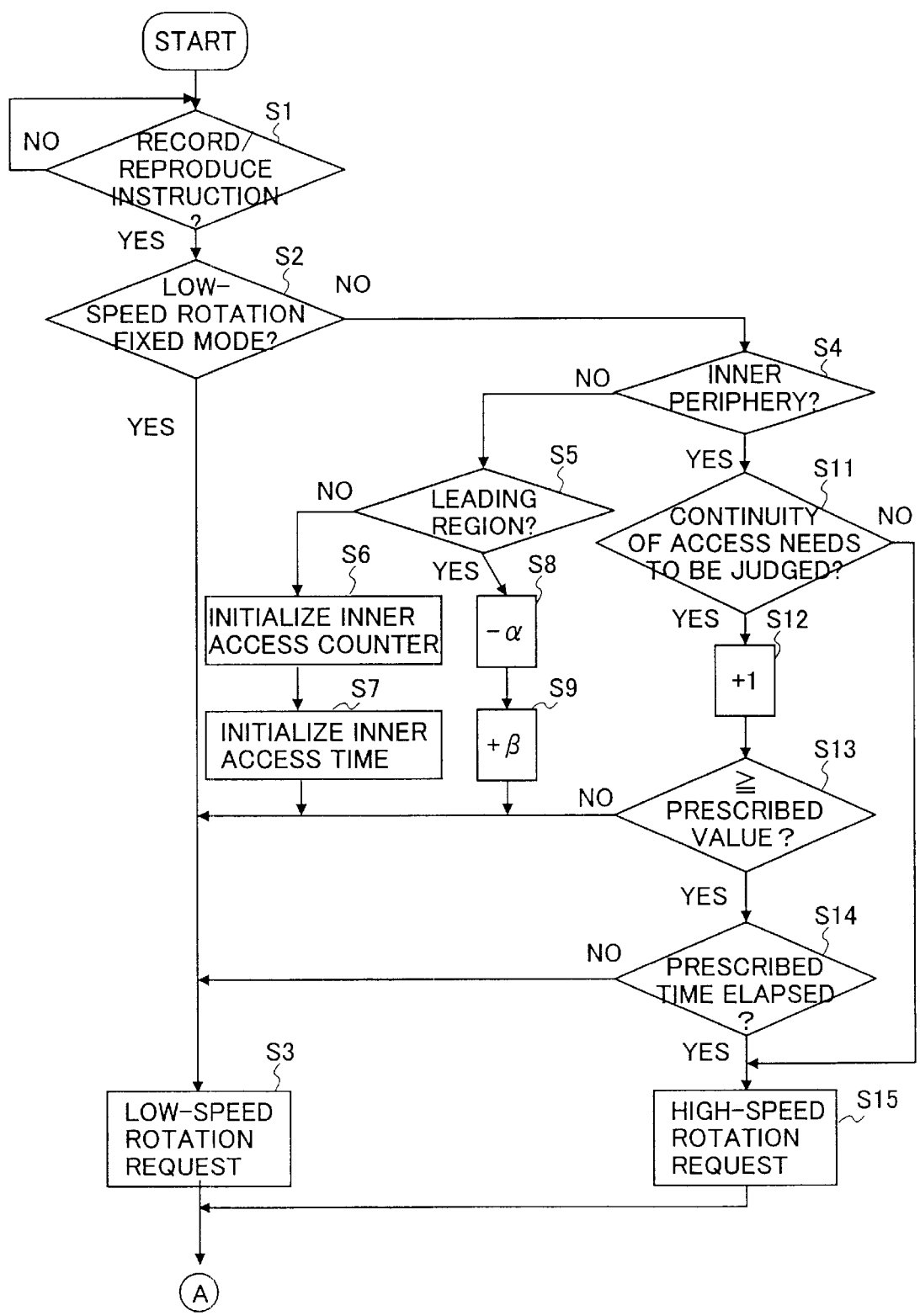
FIG. 5 is a flow chart for explaining the operation of a MPU of the first embodiment.
Figure 6:
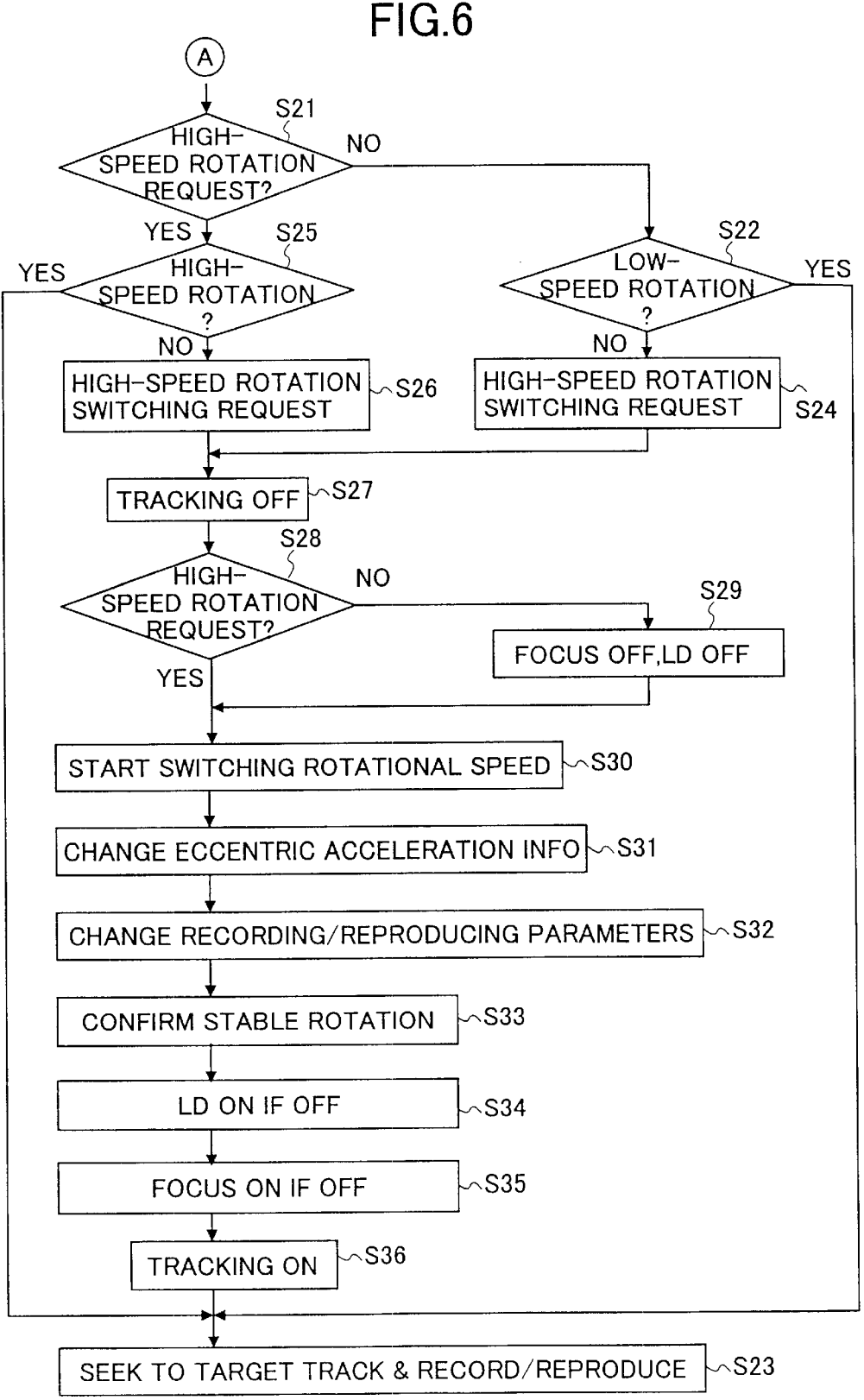
FIG. 6 is a flow chart for explaining the operation of the MPU of the first embodiment.

FIGS. 5 and 6 are flow charts for explaining the operation of the MPU 12 of this embodiment.

In FIG. 5, a step S1 decides whether or not a recording or reproducing instruction is issued from the host unit. If the decision result in the step S1 is YES, a step S2 decides whether or not a normal mode, that is, a low-speed rotation fixed mode of the ZCAV system, is instructed. If the decision result in the step S2 is YES, a step S3 sets a low-speed rotation request, and the process advances to a step S21 shown in FIG. 6 which will be described later.

On the other hand, if the decision result in the step S2 is NO, a kind of mode of the ZCLV system is instructed, and thus, a step S4 decides whether or not the present recording or reproducing position is located at a position recordable or reproducible in the high-speed mode, that is, whether or not the present recording or reproducing position is located on the inner peripheral side of a position where a high-speed rotation is possible. If the decision result in the step S4 is NO, a step S5 decides whether or not the present recording or reproducing position is on the outermost peripheral side of the optical disk 72, that is, in a vicinity of a leading region of the optical disk 72. If the decision result in the step S5 is NO, a step S6 initializes an inner access counter within the MPU 12, a step S7 initializes an inner access time managed within the MPU 12, and the process advances to the step S3. In addition, if the decision result in the step S5 is YES, a step S8 decreases a value of the inner access counter by $\alpha$, a step S9 increases a value of the inner access time by $\beta$, and the process advances to the step S3.

Therefore, in the leading region of the optical disk 72, the conditions for judging continuity of the access is relaxed, so that the rotational speed increases more easily. Regions for managing a state of use of the files, such as a FAT region and a directory region, are provided in the leading region of the optical disk 72. Even when the host unit carries out a sequential process with respect to a region on the inner peripheral side of the optical disk 72, an access to the leading region is generated since the directory region is occasionally updated in order to update or add the file information. Accordingly, by relaxing the conditions for judging the continuity of the access, even if the rotational speed decreases due to the updating of only the directory information during the sequential process, the rotational speed increases before the random access so as to prevent the random access performance from deteriorating.

If the decision result in the step S4 is YES, a step S11 decides whether or not the continuity of the access needs to be judged. The process advances to a step S15 which will be described later if the decision result in the step S11 is NO. ON the other hand, if the decision result in the step S11 is YES, a step S12 increments the inner access counter by one, and a step S13 decides whether or not the value of the inner access counter is greater than or equal to a prescribed value. The process advances to the step S3 if the decision result in the step S13 is NO, and the process advances to a step S14 if the decision result in the step S13 is YES. The step S14 decides whether or not a prescribed time has elapsed from a last outer access which is made in a low-speed mode, and the process advances to the step S3 if the decision result in the step S14 is NO. If the decision result in the step S14 is YES or the decision result in the step S11 is NO, the step S15 sets a high-speed rotation request for recording or reproducing in the high-speed mode, and the process advances to the step S21 shown in FIG. 6.

The prescribed time described above is set so that the rotational speed of the optical disk 72 which once decreases does not easily increase again, to thereby prevent deterioration of the random access performance and the decrease of the data transfer rate which would otherwise occur if the rotational speed were frequently switched.

In FIG. 6, the step S21 decides whether or not the high-speed rotation request exists, and the process advances to a step S22 if the decision result in the step S21 is NO. The step S22 decides whether or not the present mode is the normal mode, that is, the optical disk 72 is undergoing low-speed rotation. If the decision result in the step S22 is YES, a step S23 carries out a seek to a target track on the optical disk 72, to carry out a recording or reproduction. If the decision result in the step S22 is NO, a step S24 sets a low-speed rotation switching request, and the process advances to a step S27 which will be described later.

If the decision result in the step S21 is YES, a step S25 decides whether or not the present mode is the high-speed mode, that is, the optical disk 72 is undergoing a high-speed rotation. The process advances to the step S23 if the decision result in the step S21 is YES. If the decision result in the step S25 is NO or after the step S24, the step S27 turns OFF the tracking servo based on the TES E2. A step S28 decides whether or not the high-speed rotation request exists. If the decision result in the step S28 is NO, a step S29 turns OFF the focus servo based on the FES El, and turns OFF the laser diode 30-1, in order to prevent the data on the optical disk 72 from being destroyed. If the decision result in the step S28 is YES or after the step S29, a step S30 starts switching of the rotational speed. The switching of the rotational speed may be carried out based on a table which indicates the relationships shown in FIG. 3, for example, by storing the table in the memory 18, for example.

A step S31 changes eccentric acceleration information depending on the new rotational speed of the optical disk 72 after the switching of the rotational speed. The eccentric acceleration information is changed by replacing contents (eccentric acceleration information) of an eccentric acceleration table within the memory 18, for example, or by recalculating the eccentric acceleration information, depending on the new rotational speed. The eccentric acceleration information relates to the acceleration which is generated due to the eccentricity of the optical disk 72, and will be described later. A step S32 changes various recording or reproducing parameters which are used during the recording or reproduction, depending on the new rotational speed. A step S33 confirms the stabilized rotation of the optical disk 72. A step S34 turns ON the laser diode 30-1 if the laser diode 30-1 is OFF. A step S35 turns ON the focus servo if the focus servo is OFF. In addition, a step S36 turns ON the tracking servo if the tracking servo is OFF, and the process advances to the step S23.

By the operation described above, it is possible to carry out a process (1) which switches and sets between the low-speed rotation fixed mode and the rotational speed switching mode, and a process (2) which switches and sets whether or not to judge the continuity of the access in the rotational speed switching mode. The process (1) can be carried out by setting a flag which is used for the decision in the step S2 shown in FIG. 5. In addition, the process (2) can be carried out by setting a flag which is used for the decision in the step S11 shown in FIG. 5 in a state where the process (1) sets the rotational speed switching mode. Methods of setting these flags are not limited to specific methods. For example, a method which sets the mode from the host unit, a method which sets the mode in a nonvolatile memory within the memory 18, and a method which writes mode setting information on the optical disk 72 from the host unit and sets the mode based on the written mode setting information may be used to set these flags.

Figure 8:
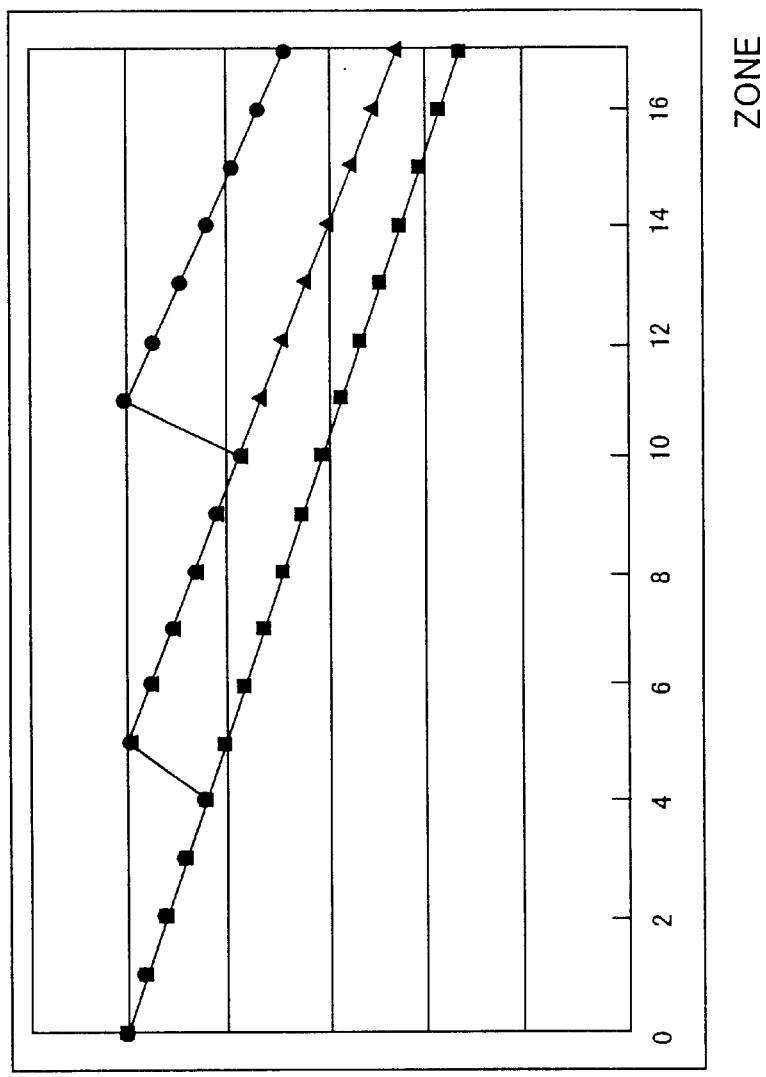
FIG. 8 is a diagram showing the relationships of the zone on the optical disk, a recording or reproducing power and the rotational speed of the optical disk.

The recording or reproducing parameters set in the step S32 shown in FIG. 6 include the recording or reproducing clock frequency and the recording or reproducing power of the laser diode 30-1. FIGS. 7 and 8 are diagrams for explaining the recording or reproducing parameters which are changed.

FIG. 7 is a diagram showing the relationships of the zone on the optical disk 72, the recording or reproducing clock frequency and the rotational speed of the optical disk 72. In FIG. , the unit of the recording or reproducing clock frequency is MHz.

FIG. 8 is a diagram showing the relationships of the zone on the optical disk 72, the recording or reproducing power and the rotational speed of the optical disk 72. In FIG. 8, a rectangular mark indicates a case where the rotational speed is 3637 rpm, a triangular mark indicates a case where the rotational speed is 4138 rpm, and a circular mark indicates a case where the rotational speed is 5001 rpm.

For example, as proposed in a Japanese Laid-Open Patent Application No. 11-73669, a test write obtains an error quantity of an optimum recording or reproducing power with respect to a default recording or reproducing power of a power default table, so as to optimize the recording or reproducing power. For this reason, this embodiment does not need to carry out the test write every time the rotational speed is switched. In other words, when the rotational speed is switched, it is only necessary to switch the power default table corresponding to each rotational speed, and the optimum recording or reproducing power at each rotational speed can be optimized by correcting the default recording or reproducing power of the corresponding power default table by the same error quantity.

Furthermore, this embodiment can minimize the processing time, because the process of changing the parameters dependent on the rotational speed of the optical disk 72, such as the eccentric acceleration information and the recording or reproducing parameters, is carried out in parallel with the process of switching the rotational speed.

Figure 9:
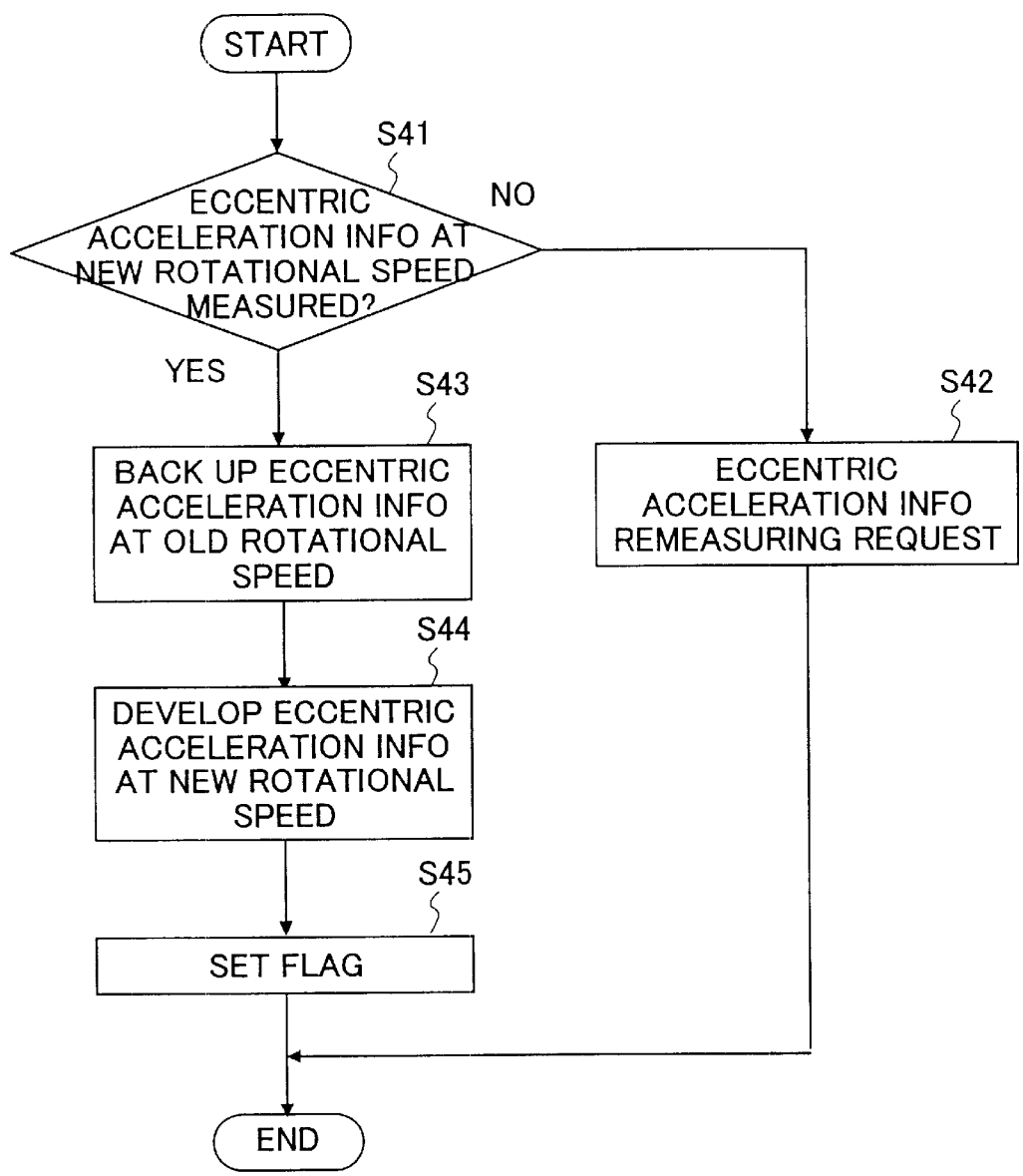
FIG. 9 is a flow chart for explaining an eccentric acceleration information switching process.

FIG. 9 is a flow chart for explaining an eccentric acceleration information switching process of the step S31 shown in FIG. 6. In this embodiment, it is assumed for the sake of convenience that the eccentric acceleration information switching process is carried out by the DSP 16 under the control of the MPU 12. In FIG. 9, a step S41 decides whether or not the eccentric acceleration information at the new rotational speed of the optical disk 72 is already measured in the past. If the decision result in the step S41 is NO, a step S42 sets an eccentric acceleration information remeasuring request, and the process ends. Hence, the eccentric acceleration information at the new rotational speed is measured by a known method and is stored in the eccentric acceleration table. For example, methods of measuring and learning the eccentric acceleration information are proposed in a Japanese Laid-Open Patent Application No. 2000-339729.

On the other hand, if the decision result in the step S41 is YES, a step S43 provides a backup for the eccentric acceleration information corresponding to the old rotational speed and stored in the memory within the DSP 16 or in the memory 18. A step S44 develops the eccentric acceleration information corresponding to the new rotational speed in the memory within the DSP 16 or in the memory 18. A step S45 sets a flag with respect to the eccentric acceleration information corresponding to the old rotational speed, and the process ends.

The eccentric acceleration information changes when the rotational speed of the optical disk 72 changes, and thus, it is necessary to obtain the eccentric acceleration information depending on the rotational speed. Because it takes time to measure and store the eccentric acceleration information, it is desirable not to carry out the process of remeasuring the eccentric acceleration information as much as possible when the rotational speed is switched. Hence, this embodiment decides whether or not the eccentric acceleration information corresponding to the new rotational speed is already measured, and if in the affirmative, this embodiment merely replaces the contents of the eccentric acceleration table, so as to minimize the processing time by omitting the remeasuring process.

Figure 10:
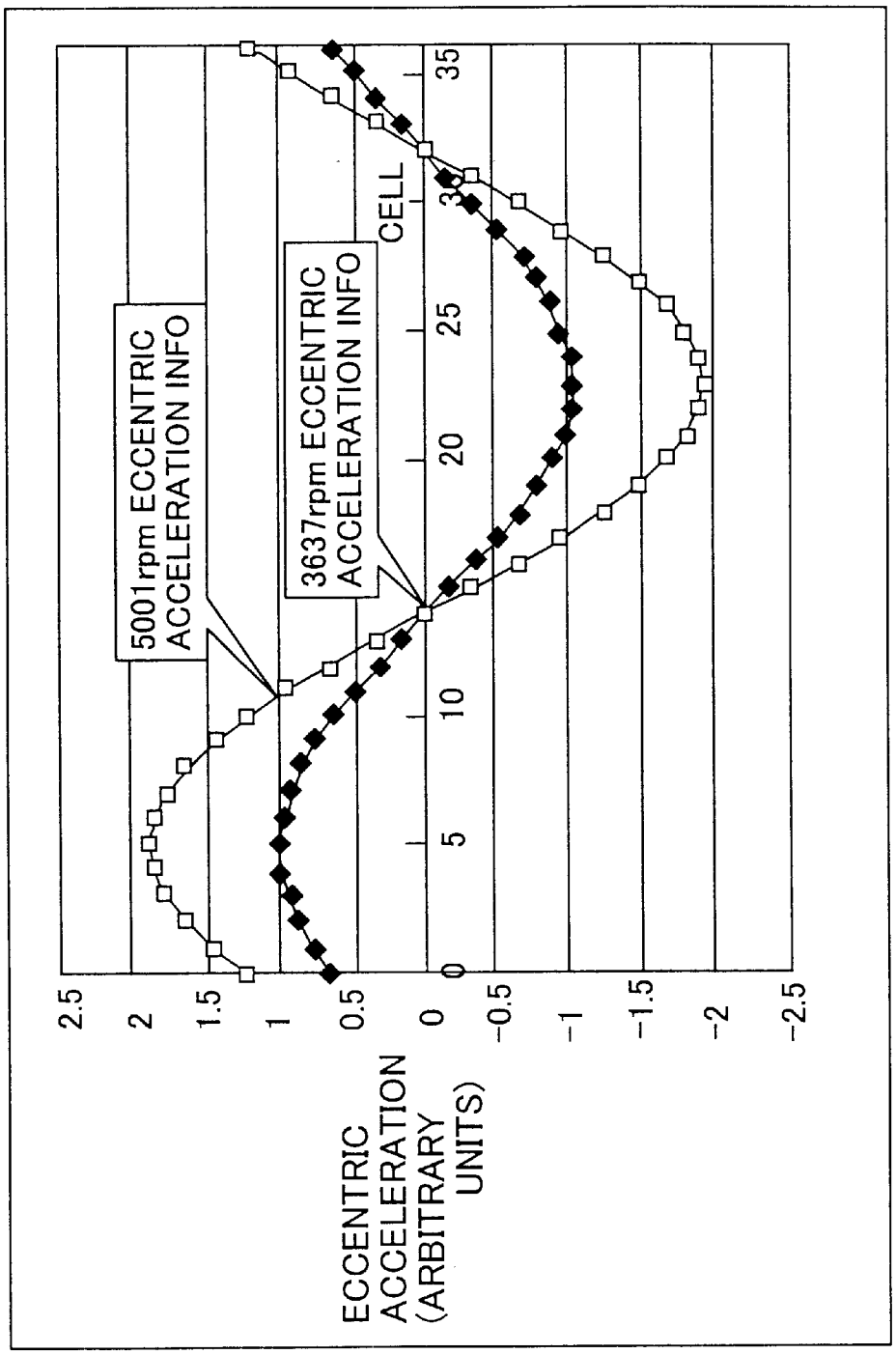
FIG. 10 is a diagram for explaining the eccentric acceleration information switching process.

FIG. 10 is a diagram for explaining the eccentric acceleration information switching process of the step S31 shown in FIG. 6. More particularly, FIG. 10 is a diagram for explaining a case where the eccentric acceleration information is switched by calculation. In FIG. 10, the ordinate indicates the eccentric acceleration in arbitrary units, and the abscissa indicates a memory cell number in the memory within the DSP 16 or in the memory 18. In addition, a rectangular mark indicates the eccentric acceleration corresponding to a case where the rotational speed is 5001 rpm, and a diamond mark indicates the eccentric acceleration corresponding to a case where the rotational speed is 3637 rpm.

In the DSP 16, a reference signal indicating one rotation of the optical disk 72 is generated based on a signal obtained via the read LSI circuit 24 and the ODC 14. This reference signal maintains the relationship with respect to a position along a circumferential direction of the optical disk 72 even when the rotational speed of the optical disk 72 changes. Accordingly, the DSP 16 calculates the eccentric acceleration information (eccentric acceleration transition) amounting to one rotation based on the reference signal, and successively stores the eccentric acceleration information in the memory cell numbers of the memory within the DSP 16 or within the memory 18. For the sake of convenience, FIG. 10 shows a case where the eccentric acceleration information of the eccentric acceleration table corresponding to the rotational speed of 5001 rpm is calculated from the eccentric acceleration information of the eccentric, acceleration table corresponding to the rotational speed of 3637 rpm. Accordingly, the eccentric acceleration in this case becomes $(5001/3637)^2$ times when the rotational speed of the optical disk 72 changes, and an eccentric acceleration table is calculated in which the eccentric acceleration information stored in the memory cell numbers is multiplied by $(5001/3637)^2$. Furthermore, since the elapsed time corresponding to one memory cell is multiplied by $(3637/5001)$, if an updating time of the memory cells for the case where the rotational speed is 3637 rpm is denoted by 1, the parameters are set with respect to the DSP 16 so that the memory cells are updated $1 \times (3637/5001)$ at a time for the case where the rotational speed is 5001 rpm.

Therefore, according to this embodiment, it is possible to an optimum random access performance or data transfer rate depending on the needs, by switching the table of the recording or reproducing parameters, such as the recording or reproducing clock frequency, the recording or reproducing power and the eccentric acceleration information, when the rotational speed of the optical disk 72 is switched.

FIG. 11 is a diagram for explaining a buffer region provided on the optical disk 72 in a modification of the first embodiment. As indicated by a rectangular surrounding mark in FIG. 11, the buffer region may be provided at a boundary portion of the optical disk 72 between a region which is accessible in the normal mode and a region which is accessible in the high-speed mode. In this case, when an access request to the region which is accessible in the high-speed mode is generated in the normal mode, it is detected that the access is generated with respect to the region located on the inner peripheral side of the buffer region on the optical disk 72, and the optical disk 82 is rotated at the high rotational speed to switch the mode to the high-speed mode. In other words, the operation of the MPU 12 in this case is substantially the same as the operation of the first embodiment, except that the buffer region is recognized.

When an access request to a certain region on the outer peripheral side of the optical disk 72 is generated in the high-speed mode, and this certain region is the buffer region, it is possible not to immediately switch to the normal mode, but to switch to the normal mode when an access request to a region on the outer peripheral side of the buffer region is generated. In addition, when an access request to a region of the optical disk 72 accessible in the high-speed mode is generated, it is possible not to immediately switch the rotational speed of the optical disk 72 to the high rotational speed, but to measure the state of the access and to switch the rotational speed to the high rotational speed only when an access to a region located on the inner peripheral side of the buffer region of the optical disk 72 is consecutively generated. Moreover, when an access request to a region on the outer peripheral side of the optical disk 72 is generated during access to a region on the inner peripheral side of the optical disk 72 in the high-speed mode, it is also possible to immediately switch the rotational speed of the optical disk 72 to the rotational speed of the region on the outer peripheral side of the optical disk 72.

Accordingly, by providing the buffer region on the optical disk 72 and switching the rotational speed of the optical disk 72 in a hysteresis manner, frequent occurrences of the consecutive access and switching of the rotational speed can be suppressed, so that it is possible to prevent deterioration of the random access performance and the data transfer rate.

In the first embodiment and the modification thereof, it is possible to disable the mode switching operation, so that the mode is fixed to the normal mode or the high-speed mode. IN this case, the MPU 12 can disable the mode switching operation in response to a mode fixing request from the host unit. Such a mode fixing request may be generated based on an instruction from the user who uses the host unit or, generated by linking with an application software of the host unit.

Figure 12:
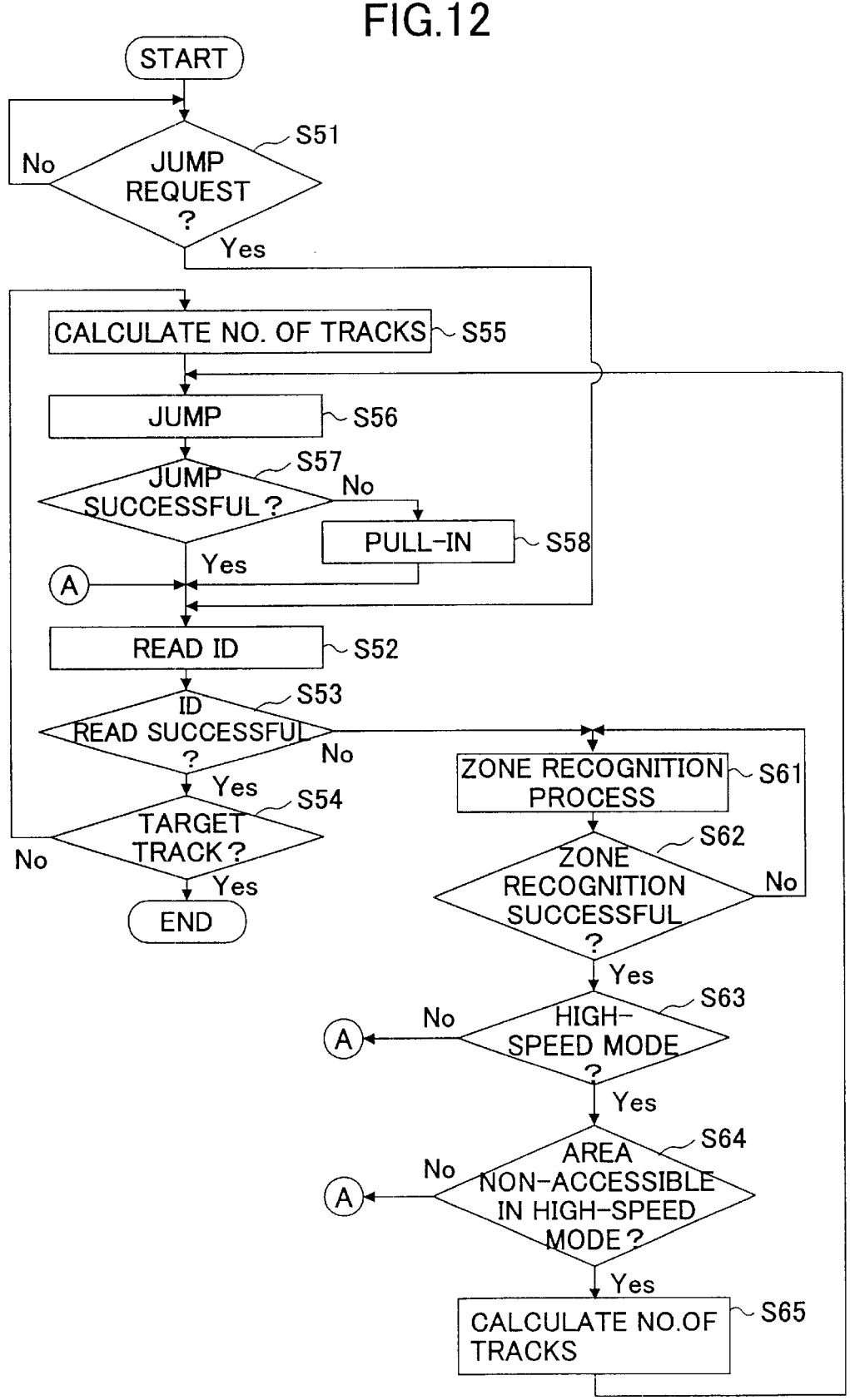
FIG. 12 is a flow chart for explaining a track jump process of the first embodiment.

Next, a description will be given of a track jump process of this first embodiment. FIG. 12 is a flow chart for explaining the track jump process of this first embodiment. The process shown in FIG. 12 is carried out by the MPU 12, and corresponds to the first embodiment of the track jump method according to the present invention.

In FIG. 12, a step S51 decides whether or not a jump request (jump command) was issued from the host unit, and the process advances to a step S52 if the decision result in the step S51 is YES. In each sector of each zone of the optical disk 72, information is recorded with a format made up of the ID signal and user data. The ID signal includes information indicating the position on the optical disk 72, including a zone number. The step S52 carries out an ID read process to read the ID signal from the optical disk 72. A step S53 decides whether or not the ID read process was successful. If the decision result in the step S53 is YES, a step S54 decides whether or not a target track included in the jump request has been reached, and the process ends if the decision result in the step S54 is YES.

On the other hand, if the decision result in the step S54 is NO, the process advances to a step S55. The step S55 calculates a number of tracks to be jumped, and a step S56 executes the jump corresponding to the calculated number of tracks. A step S57 decides whether or not the jump was successful, and the process advances to the step S52 described above if the decision result in the step S57 is YES. If the decision result in the step S57 is NO, a step S58 carries out a pull-in to the target track by the tracking servo, and the process advances to the step S52.

If the decision result in the step S53 is NO, a step S61 carries out a zone recognition process. Various known methods may be employed for the zone recognition process which recognizes the zone on the optical disk 72. For example, it is possible to employ the method proposed in a Japanese Laid-Open Patent Application No. 9-55014. When the optical disk 72 is loaded into the optical disk unit, the ID signal is read so as to recognize the type and the like of the optical disk 72. In addition, the number of sectors within each zone of the optical disk 72 is determined in advance. Accordingly, by use of the ID signal which is read when the optical disk 72 is loaded into the optical disk unit, it is possible to recognize the zone to which the present position belongs, from the number of sectors corresponding to one rotation of the optical disk 72 or the time required to pass one sector of the optical disk 72. A step S62 decides whether or not the zone recognition process was successful, and the process returns to the step S61 if the decision result in the step S62 is NO.

If the decision result in the step S62 is YES, a step S63 decides whether or not the mode of the optical disk unit is the high-speed mode. The process returns to the step S52 if the decision result in the step S63 is NO. If the decision result in the step S63 is YES, a step S64 decides whether or not the present position is located within an area where the high-speed mode cannot be used. The process returns to the step S52 if the decision result in the step S64 is NO. On the other hand, if the decision result in the step S64 is YES, a step S65 calculates the number of tracks to be jumped, from a difference between the zone to which the target track belongs and the recognized zone to which the present position belongs, and the process thereafter advances to the step S56.

Therefore, when the jump request is received from the host unit, the number of tracks to be jumped is calculated from the target track specified by the jump request and the present position (present track), and the track jump amounting to the calculated number of tracks is made. By this track jump, it is possible to move to the zone to which the target track belongs or to the zone which is adjacent to the zone to which the target track belongs. After the track jump ends, the ID signal prerecorded on the optical disk 72 is read, and a confirmation is made to determine whether or not the track information obtained from the ID signal is the track information of the target track. The process ends if the track information obtained from the ID signal is the track information of the target track. On the other hand, if the track information obtained from the ID signal is not the track information of the target track, the track jump is repeated until the target track is reached.

If the reading of the ID signal fails after the track jump ends, the zone recognition process is carried out. The zone recognition process is also carried out to reset the recording or reproducing clock if the present position which is actually tracked and the target track belong to mutually different zones, such as when the track jump fails and when an error is generated in the detected number of tracks jumped. When the zone recognition process is successful, a retry of the ID signal reading process is carried out.

For example, assume that the optical disk 72 rotates at the rotational speed of 5001 rpm in FIG. 3, the present position belongs to the zone 17, and the jump request is generated to jump to the target track belonging to the zone 12. In addition, assume that the pull-in to the target track by the tracking servo failed, and the present position moves to a vicinity of the zone 10. In this case, the recording or reproducing clock for carrying out the recording or reproduction with respect to the zone 10 at the rotational speed of 5001 rpm cannot be set in this embodiment due to the limit frequency of the circuit. For this reason, the ID signal reading process will not be successful even if the retry thereof is carried out. Accordingly, a decision is made to determine whether or not the mode of the optical disk unit is the high-speed mode, and the retry of the ID signal reading process is prohibited so as to reduce the number of retries if the mode is the high-speed mode and the present position belongs to an area to which the recording or reproduction cannot be made in the high-speed mode. In other words, only the zone to which the present position belongs is recognized, the number of tracks to be jumped is calculated from the difference between the zone to which the present position belongs and the zone to which the target track belongs, and the jump is made to the zone to which the target track belongs. In this case, the number of tracks between the zones 10 and 12 is calculated, and the jump is made towards the zone 12.

The number of tracks traversed during a move between the zones can easily be calculated from a media specification. FIG. 13 is a diagram showing a table which stores an example of the media specification. For example, the table shown in FIG. 13 may be stored in the memory 18 or in the internal memory of the MPU 12. As shown in FIG. 13, the table stores information such as the number of physical tracks and the number of sector/physical tracks for each zone (band). Hence, the number of tracks traversed during the move between the zones can be calculated by referring to this table.

Next, a description will be given of a second embodiment of the storage apparatus according to the present invention. The construction of this second embodiment of the storage apparatus is the same as that of the first embodiment of the storage apparatus shown in FIGS. 1 and 2, and an illustration thereof will be omitted. In this second embodiment of the storage apparatus, the present invention is applied to an optical disk. In addition, this second embodiment of the storage apparatus employs a second embodiment of the track jump method according to the present invention.

Figure 14:
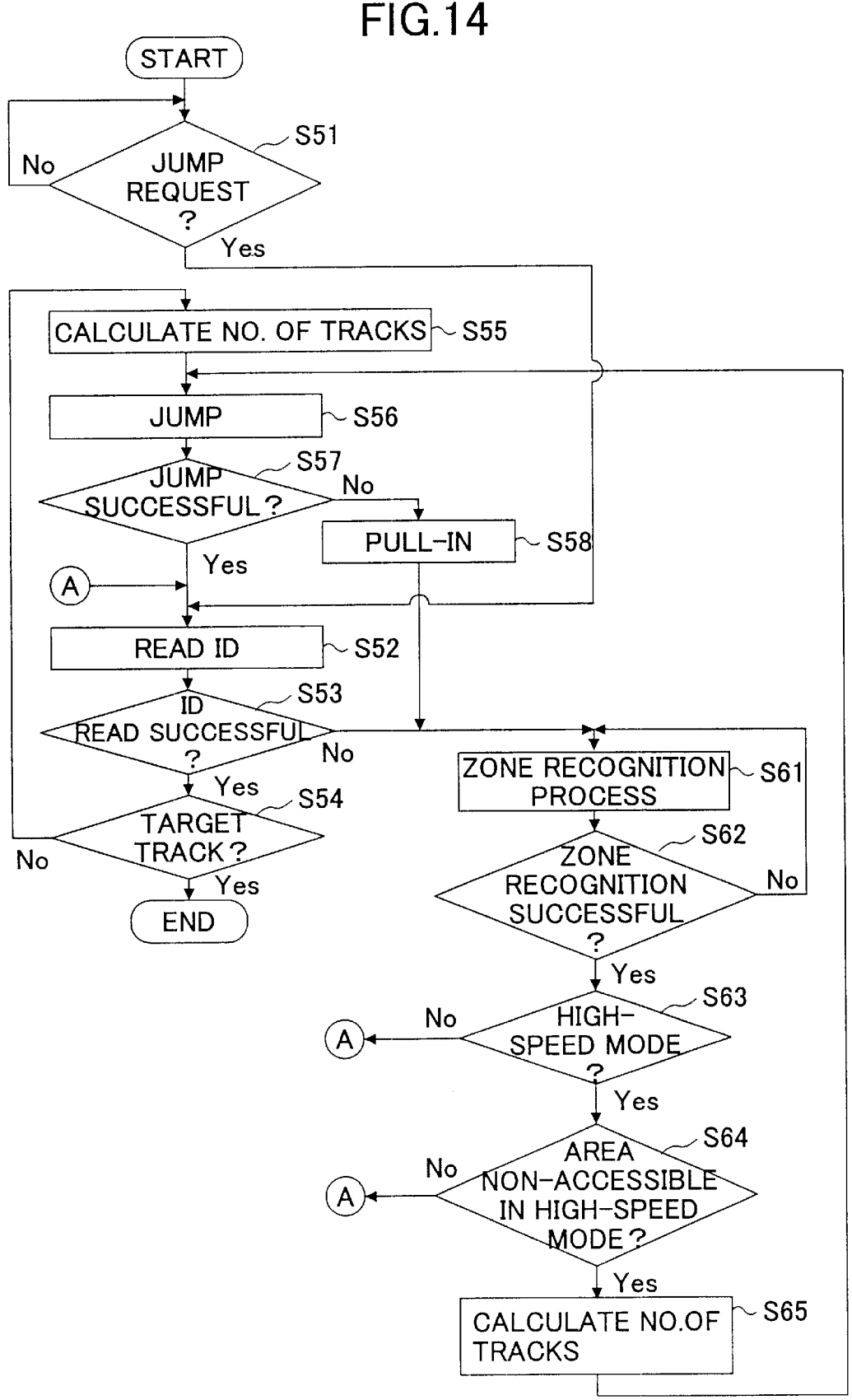
FIG. 14 is a flow chart for explaining a track jump process of a second embodiment.

FIG. 14 is a flow chart for explaining a track jump process of this second embodiment. The track jump process shown in FIG. 14 is carried out by the MPU 12, and corresponds to the second embodiment of the track jump method. In FIG. 14, those steps which are the same as those corresponding steps in FIG. 12 are designated by the same reference numerals, and a description thereof will be omitted.

The process shown in FIG. 14 differs from the process shown in FIG. 12 in that the process advances to the step S61 when the step S58 is carried out. In other words, the zone recognition process is carried out immediately when the jump fails.

When the track jump fails during the high-speed mode in the track jump processes shown in FIGS. 12 and 14, the present position may enter an area to which the recording or reproduction cannot be made in the high-speed mode, and there is a possibility that the retry of the ID signal reading process will be generated frequently. It is conceivable to reduce the rotational speed of the optical disk if the ID signal reading process fails or the present position enters the area to which the recording or reproduction cannot be made in the high-speed mode, but this would only increase the retry time. Furthermore, in the high-speed mode, it becomes impossible to carry out an inner/outer linear correction of the TES offset which is carried out by a recovery process or the like proposed in the Japanese Laid-Open Patent Application No. 2000-187855, for example.

On the other hand, in the present invention, when the present position enters the area to which the recording or reproduction cannot be made in the high-speed mode, the next position confirmation is limited to the zone recognition. In addition, the number of tracks to be jumped is calculated from the zone to which the present position belongs and the zone to which the target track belongs, and the jump is made to the area to which the recording or reproduction can be made in the high-speed mode, before making a positioning to the target track based on the ID signal. Accordingly, the present invention can minimize the retry time, because the retry of the ID signal reading process will not be generated frequently and the retry does not require a long time. For this reason, the present invention can carry out the inner/outer linear correction of the TES offset which is carried out by the recovery process or the like, even in the high-speed mode. Moreover, since the zone recognition process can be carried out at a high speed, the present invention can carry out various kinds of adjusting processes at a high speed based on the recognized zone. Furthermore, the present invention can carry out the data processing without interruption, and realize a data processing having a high reliability even in the high-speed mode.

In the embodiments described above, the present invention is applied to an optical disk unit which uses a magneto-optical disk. However, the present invention is of course similarly applicable to apparatuses which use disk-shaped recording media such as phase-change type optical disks and magnetic disks. In addition, the shape of the recording medium is not limited to the disk-shape, and the recording medium may have a card-shape or the like with a spiral track or concentric tracks formed similarly to the optical disk of the above described embodiments.

Further, the present invention is not limited to these embodiments, but various variations and modifications may be made without departing from the scope of the present invention.

What is claimed is:

1. A track jump method for jumping to an arbitrary track on a recording medium when making access to the recording medium, said recording medium being divided into a plurality of zones in a radial direction thereof and employing a ZCAV system, said track jump method comprising the steps of:

(a) recognizing a zone to which a present position on the recording medium belongs; and
   (b) jumping to a first zone to which the arbitrary track belongs or to a second zone which is adjacent to the first zone, based on a distance between the first zone and the zone that is recognized by the step (a).

2. The track jump method as claimed in claim 1, further comprising the step of:

(c) calculating a number of tracks to be jumped by the step (b) based on a number of tracks of the zone recognized by the step (a) and a number of tracks of the first zone.

3. The track jump method as claimed in claim 2, wherein the step (c) calculates the number of tracks by referring to a table which stores a number of tracks of each of the zones of the recording medium.

4. A storage apparatus for jumping to an arbitrary track on a recording medium in response to a track jump request when making access to the recording medium, said recording medium being divided into a plurality of zones in a radial direction thereof and employing a ZCAV system, said storage apparatus comprising:

a zone recognizing part recognizing a zone to which a present position on the recording medium belongs; and
   a jumping part jumping to a first zone to which the arbitrary track belongs or to a second zone which is adjacent to the first zone, based on a distance between the first zone and the zone that is recognized by the zone recognizing part.

5. The storage apparatus as claimed in claim 4, further comprising:

a switching part switching a mode between a normal mode in which the recording medium is rotated at a first rotational speed and a high-speed mode in which the recording medium is rotated at a second rotational speed higher than the first rotational speed when making access from an arbitrary area towards an area on an inner peripheral side of the recording medium which is divided into a plurality of areas in the radial direction thereof.

6. The storage apparatus as claimed in claim 4, further comprising:

an ID detecting part detecting from the recording medium an ID signal which indicates a position on the recording medium,
   said zone recognizing part recognizing the zone when the ID detecting part cannot detect the ID signal.

7. The storage apparatus as claimed in claim 6, further comprising:

a part reducing a number of retries of an ID signal detection carried out by the ID detecting part when the zone recognizing part detects the zone.

8. The storage apparatus as claimed in claim 4, further comprising:

a calculating part calculating a number of tracks to be jumped by the jumping part based on a number of tracks of the zone recognized by the zone recognizing part and a number of tracks of the first zone.

9. The storage apparatus as claimed in claim 8, wherein the calculating part calculates the number of tracks by referring to a table which stores a number of tracks of each of the zones of the recording medium.

10. The storage apparatus as claimed in claim 5, further comprising:

an ID detecting part detecting from the recording medium an ID signal which indicates a position on the recording medium,
    said zone recognizing part recognizing the zone when the ID detecting part cannot detect the ID signal.

11. The storage apparatus as claimed in claim 5, further comprising:

a calculating part calculating a number of tracks to be jumped by the jumping part based on a number of tracks of the zone recognized by the zone recognizing part and a number of tracks of the first zone.

12. The storage apparatus as claimed in claim 6, further comprising:

a calculating part calculating a number of tracks to be jumped by the jumping part based on a number of tracks of the zone recognized by the zone recognizing part and a number of tracks of the first zone.

13. The storage apparatus as claimed in claim 7, further comprising:

a calculating part calculating a number of tracks to be jumped by the jumping part based on a number of tracks of the zone recognized by the zone recognizing part and a number of tracks of the first zone.

14. A storage apparatus for jumping to an arbitrary track on a recording medium in response to a track jump request when making access to the recording medium, said recording medium being divided into a plurality of zones in a radial direction thereof and employing a ZCAV system, said storage apparatus comprising:

zone recognizing means for recognizing a zone to which a present position on the recording medium belongs; and jumping means for jumping to a first zone to which the arbitrary track belongs or to a second zone which is adjacent to the first zone, based on a distance between the first zone and the zone that is recognized by the zone recognizing means.

* * * * *